3,819,633
(ISO)QUINOLYL SULFONYLUREAS HAVING ANTIDIABETIC ACTIVITY
Vittorio Ambrogi, Bresso, and Willy Logemann, Marcantonio Parenti, and Raffaele Tommasini, Milan, Italy, assignors to Carlo Erba S.p.A., Milan, Italy
No Drawing. Filed Mar. 22, 1971, Ser. No. 126,893
Claims priority, application Italy, Apr. 1, 1970, 22,739/70; Sept. 16, 1970, 29,767/70; Jan. 25, 1971, 19,717/71, 19,718/71
Int. Cl. C07d 33/60, 35/42
U.S. Cl. 260—283 SA
10 Claims

ABSTRACT OF THE DISCLOSURE

New acylamino-alkyl-benzensulfonyl ureas and process for their preparation are disclosed, for example N{4-[β-quinoline - 2 - carboxamido)ethyl]benzensulphonyl}-N'-cyclohexyl urea, N-(1-azacyclohept-1-yl)-N'-{4-[β-(quinoline-2-carboxamido)ethyl]benzensulphonyl} urea, N-{4-[β - (isoquinoline - 3 - carboxamido)ethyl]benzenesulphonyl}-N'-cyclohexyl urea, N-{4-[β-(quinoxaline-2-carboxamido)ethyl]benzenesulphonyl} - N' - cyclohexyl urea, N-(1 - azacyclohept - 1 - yl) - N' - {4-[β-(quinoxaline-2-carboxamido)ethyl]benzenesulphonyl} urea. These compounds are useful for their hypoglycemic activity.

---

This invention relates to novel heterocyclic compounds and more particularly to new acylamino-alkyl-benzenesulphonyl-ureas and a process for their preparation.

The compounds of the present invention have been found to exhibit hypoglycemic activity when administered orally in responsive cases of diabetes mellitus either alone or in combination with biguanide congeners, such as 1-phenethylbiguanide or N'-β-phenethylformamidinyliminourea (Phenformin) and its hydrochlorides. Heretofore oral diabetes mellitus therapy has been accomplished using oral hypoglycemic agents such as sulphonylureas (1-butyl-3 - p - polysulphonylurea and 1-propyl-3-p-chlorobenzenesulphonylurea) and the biguanides above.

Administration, mechanism of action and therapeutic uses of these known compounds are described in Goodman & Gilman, The Pharmacological Basis of Therapeutics (1965).

The compounds of the present invention have the following general formula:

(I)

where R is:

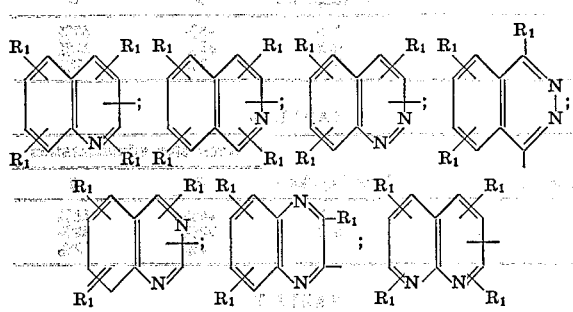

where each of the $R_1$ groups are independently hydrogen; halogen, e.g. chlorine, bromine; lower alkyl, e.g. about 1 to 4 carbon atoms such as ethyl, propyl, allyl and the like; a lower alkenyl, e.g. about 1 to 4 carbon atoms such as ethylene, propylene and the like; lower alkoxy, e.g. 1 to 4 carbon atoms such as ethoxy, butoxy and the like; hydroxy; an amino group of the general formula

where R' and R" are independently hydrogen, lower alkyl, e.g. 1 to 4 carbon atoms, such as methyl, propyl etc.; an acetylamino group; a phenyl group of the general formula

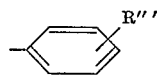

wherein R''' is hydrogen, halogen, alkyl of 1 to 4 carbon atoms, lower alkoxy; and $R_2$ is:
(a) a lower alkyl of 1 to 8 carbon atoms,
(b) a lower alkene of 2 to 8 carbon atoms,
(c) a cycloalkyl group of 3 to 8 carbon atoms optionally substituted with a lower alkyl or lower alkene as above or with a lower alkoxy, preferably methoxy,
(d) an azacycloalkyl group of 3 to 7 carbon atoms optionally substituted with a lower alkyl of 1 to 4 carbon atoms or a lower alkoxy, such as for instance:

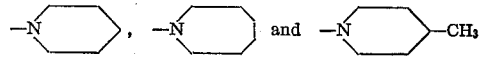

(e) an azabicycloalkyl group of 5 to 10 carbon atoms optionally substituted with alkyl groups or alkoxy groups, such as for instance:

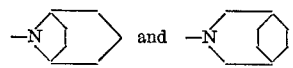

Acylaminoalkylbenzenesulphonylureas of the present invention may be prepared by reaction of compounds of the general formula:

(II)

where R has the meaning given above and $R_3$ may be halogen, amino, isocyanate, urethane or urea, with amines, ureas, isocyanates, esters of iminocarbamic acids containing the radical $R_2$ as described above, or with hydrazines of the formula $R_2$—$NH_2$.

The R—CO— radical is introduced by acylation using, for example, the corresponding substituted acid halides, azides or via mixed carboxylic-carbonic anhydrides.

The compounds of formula II can be prepared by methods taken from the literature.

As regards the reaction conditions, the embodiments of the above-identified process may, in general, vary within wide limits and may be adapted to each individual case. For example, the reaction can be effected with the use of solvents, at room temperature or at an elevated temperature.

A method of preparing the sulphonylureas of the present invention is, for example, by reacting a carboxylic acid of general formula R—COOH, wherein R is as defined above, such as for instance, quinoline-2-carboxylic acid or cinnoline-4-carboxylic acid, which are available in commerce, or quinoxaline-2-carboxylic acid prepared oxidizing with $H_2O_2$ 33% quinoxaline-2-aldehyde as described by A. Müller and I. Varga, Ber. 72, 1999 (1939), the disclosure of which is hereby incorporated by reference, or isoquinoline-3-carboxylic acid prepared oxidizing with $H_2O_2$ 30% 3 - methyl-isoquinoline and subsequently treating with water at the boiling point the peracid so obtained as described by C. E. Teague and A. Roe, J. Amer. Chem. Soc. 73, 688 (1951), the disclosure of which is hereby incorporated by reference, with an amine, for instance p-(β-aminoethyl)benzenesulfonamide prepared according to Miller E., Sprague J., Kissinger L. W.

and Mc. Burney L. F., J. Am. Chem. Soc. 62, 2099 (1950), the disclosure of which is hereby incorporated by reference.

According to this process the substituted carboxylic acid is dissolved in a solvent inert to the reactants, such as acetone, benzene, dioxane, turned into the acid halide or the mixed carboxylic-carbonic anhydride which is subsequently reacted with the benzene-sulphonamide.

The solvent is removed from the crude product by distillation and the crude product filtered and recrystallized. The resulting product is suspended in a solvent containing hydroxide ions to which is added a cycloalkyl isocyanate such as cyclohexylisocyanate, and the suspension cooled to about 0 to 5° C. and agitated at room temperature for about 1 to 8 hours, then purified and recovered. The above procedures are conducted at atmospheric pressure, however, higher and lower pressures may be used.

Additional starting materials for the above process are conveniently prepared by using the appropriate reactants and under generally the same reaction conditions.

Another method of preparing the compounds of the present invention is by reacting a compound of general formula R—Z, wherein R is as defined above and Z is a carboxy group or a functional derivative thereof, for example an acid halide or a mixed anhydride, with compounds of general formula

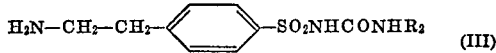

$$H_2N-CH_2-CH_2-\underset{}{\bigcirc}-SO_2NHCONHR_2 \quad (III)$$

wherein $R_2$ is as defined above. The compounds of general formula III can be prepared by methods taken from the literature.

As regards the reaction conditions, the embodiments of the above-identified process may, in general, vary within wide limits and may be adapted to each individual case. For example, the reaction can be effected with the use of solvents, at room temperature or at an elevated temperature.

The resulting compound may be converted to a pharmaceutically acceptable salt by treatment with alkaline agents or with physiologically tolerable acids. Examples of pharmaceutically acceptable salts are those derived from mineral acids such as hydrochloric acid, phosphoric acid, sulfamic acid, and sulfuric acid; and organic acids such as acetic acid, citric acid, tartaric acid, lactic acid, ascorbic acid, methane-sulfonic acid, ethanesulfonic acid, quinic acid, 3-hydroxy-2-naphthoic acid, naponic acid (1,5-naphthalenedisulfonic acid), acetylsalicylic acid, salicylic acid, mucic acid, muconic acid, and the like, giving the hydrochloride, phosphate, sulfamate, sulfate, acetate, citrate, tartrate, lactate, ascorbate, methanesulfonate, ethanesulfonate, quinate, 3-hydroxy-2-naphthoate, naponate, acetylsalicylate, salicylate, mucate, and muconate, respectively.

The compounds of the present invention are useful both in free form and in acid or basic addition salt form. Both forms are within the purview of the invention, and are considered to be one and the same invention. The acid or basic addition salts are simply a usually more convenient form for use.

The acid addition salts are prepared preferably by reacting the free base and acid in an organic solvent, e.g., ethanol, acetone, dimethylformamide, etc., in which case the salt separates directly or can be obtained by concentration of the solution.

Although pharmaceutically-acceptable salts are preferred, all acid and basic addition salts are within the scope of our invention. All acid and basic addition salts are useful as sources of the free form even if the particular salt per se is not desired as the final product as for example when the salt is formed for purposes of purification or identification, or when it is used as an intermediate in preparing a pharmaceutically-acceptable salt.

Pharmacological activity of the compounds of the present invention in the treatment of diabetes mellitus was investigated by screening method based on depression of blood sugar values in intact animals (William E. Dulin in Animal and Clinical Pharmacologic Techniques in Drug Evaluation—Year Book Med. Publ. 1964; August Loubatières in Evaluation of Drug Activities: Pharmacometrics—Acad. Press N.Y. 1964). The method is derived from U.S.P. rabbit assay of insulin products and is a modification of method described by Hökfelt and Jönsson (J. Med. Pharm. Chem. 5, 231, 1962) in a study of large number of sulfonylureas. In this study New Zealand white rabbits weighing 2.5 to 3.0 kg. were fasted for a period of 16 hours. For each compound tested three groups of six animals each were used. The compounds were administered per os suspended in 0.5 ml. Methacel 400 in a volume of 0.5 ml./kg.

Group I received compound at dose of 1.5 mg./kg.

Group II received compound at dose of 0.3 mg./kg., while

Group III, the control group, received only suspendent.

Blood samples were taken from the animals of all three groups before administration of the drug, at 3 hours after administration of the respective compounds and again 6 hours thereafter. The samples were measured for blood glucose content according to the method of o-toluidine (K. N. Dubowsky-Clin. Chem. 8, 215 1967).

The percent lowering of blood glucose levels after treatment with N-{4-[β-(quinoline - 2 - carboxamido)ethyl] benzenesulphonyl}-N'-cyclohexyl urea (Table I), with N-(1-azacyclohept - 1 - yl)-N'-{4-[β-(quinoline-2-carboxamido)ethyl]benzenesulphonyl} urea (Table II), with N-{4-[β-(isoquinoline - 3 - carboxamido)ethyl]benzenesulphonyl}-N'-cyclohexyl urea (Table III), with N-{4-[β-quinoxaline - 2 - carboxamido)ethyl]benzenesulphonyl}-N'-cyclohexyl urea (Table IV and with N-(1-azacyclohept-1-yl)-N'-{4-[β-(quinoxaline - 2 - carboxamido)ethyl]benzenesulphonyl}urea (Table V), as calculated against levels measured prior to administration of the compounds, is shown below.

TABLE I

| Group | Dose (mg./kg.) | Hours after administration | |
|---|---|---|---|
| | | 3 | 6 |
| I | 1.5 | 38% | 49% |
| II | 0.3 | 34% | 43% |
| III | 0 | 1% | 3% |

TABLE II

| Group | Dose (mg./kg.) | Hours after administration | |
|---|---|---|---|
| | | 3 | 6 |
| I | 2.5 | 43% | 55% |
| II | 1.5 | 39% | 53% |
| III | 0 | 1% | 3% |

TABLE III

| Group | Dose (mg./kg.) | Hours after administration | |
|---|---|---|---|
| | | 3 | 6 |
| I | 1.5 | 48% | 57% |
| II | 0.3 | 33% | 52% |
| III | 0 | 2% | 2% |

TABLE IV

| Group | Dose (mg./kg.) | Hours after administration | |
|---|---|---|---|
| | | 3 | 6 |
| I | 1.5 | 45% | 56% |
| II | 0.3 | 32% | 49% |
| III | 0 | 1% | 2% |

TABLE V

| Group | Dose (mg./kg.) | Hours after administration | |
|---|---|---|---|
| | | 3 | 6 |
| I | 1.5 | 47% | 56% |
| II | 0.3 | 38% | 55% |
| III | 0 | 1% | 3% |

A significant lowering of blood glucose levels will be readily observed from the above tables. Moreover, these levels were achieved using an effective dose of only a few milligrams, indicating a high degree of activity of the compounds of the invention.

The compounds of the present invention can be conveniently incorporated with pharmaceutical carriers or diluents such as, for instance, gelatine capsules; microcrystalline cellulose; lactose; natural gums; starches, such as corn starch and potato starch; cellulose derivatives, such as sodium carboxymethyl cellulose, ethyl cellulose, methyl cellulose, cellulose acetate phthalate; gelatin; talc; stearic acid; magnesium stearate; as well as other non-toxic compatible substances used in pharmaceutical formulations.

The compositions are preferably in a form suitable for oral administration, for example tablets, capsules, powder packets, liquid solutions, suspensions or elixirs.

The invention is illustrated by the following examples.

EXAMPLE 1

Quinoline-2-carboxylic acid (3.17 g.) in anhydrous acetone (40 ml.) and triethylamine (2.55 ml.) was agitated for 15 mins. at 0° C., treated dropwise under stirring with ethyl chloroformate (1.96 ml.) over 15 mins. and cooled to —5° C. p-($\beta$-aminoethyl)benzenesulphonamide (3.63 g.) in water (15 ml.) and triethylamine (2.55 ml.) was added suddenly and the mixture was agitated for 4 hours at room temperature; the acetone was removed by distillation. The mixture was acidified with dilute hydrochloric acid, and the crude product that separated was filtered and purified through dissolution into dilute NaOH and precipitation with dilute HCl. 4-[$\beta$-(quinoline-2-carboxamido)ethyl]benzenesulphonamide (5.1 g.) was so obtained, m.p. 209–211° C. Benzenesulphonamide (3.56 g.) was suspended in acetone (100 ml.) and NaOH 2 N (5 ml.), and treated dropwise at 0° to 5° C. with cyclohexylisocyanate (1.25 g.), stirred for a night at room temperature, diluted with water, filtered to remove undissolved products, and acidified with dilute hydrochloric acid.

N-{4-[$\beta$-(quinoline-2-carboxamido)ethyl]benzenesulphonyl}-N'-cyclohexylurea (4.8 g.), m.p. 155–157° C. was produced from recrystallisation of the precipitate from ethanol.

EXAMPLE 2

Using the procedure of Example 1, 2-chloro-quinoline-4-carboxylic acid (3.5 g.) was converted to N-{4-[$\beta$-(2-chloro - quinoline-4-carboxamido)ethyl]benzenesulphonyl}-N'-cyclohexyl-urea (4.1 g.) m.p. 240–242° C. (after recrystallisation from ethanol).

EXAMPLE 3

Using the procedure of Example 1, 2-methoxyquinoline-4-carboxylic acid (4.3 g.) was converted to N-{4-[$\beta$-(2 - methoxyquinoline-4-carboxamido)ethyl]benzenesulphonyl}-N'-cyclohexyl-urea (5.1 g.) m.p. 233–235° C. (after recrystallisation from ethanol).

EXAMPLE 4

N-{4-[$\beta$ - (quinoline-2-carboxamido)ethyl]benzenesulphonyl}methylurethane (4.13 g.), m.p. 195–197° C. and 1-amino-1-azacycloheptane (1.32 g.) were dissolved into methanol (75 ml.); the methanol was removed by distillation, and the residue was heated at 120° C. for 30 mins. to give, after recrystallisation from methanol, N-(1-azacyclohept-1-yl) - N' - {4 - [$\beta$ - (quinoline-2-carboxamido)ethyl]benzenesulphonyl}urea (2.3 g.) m.p. 183–185° C.

EXAMPLE 5

Proceeding as in Example 4, N-{4-[$\beta$-(quinoline-2-carboxamido)ethyl]benzenesulphonyl}methyl-urethane (4.15 g.) and 3-amino-3-azabicyclo[3.2.2]nonane (1.6 g.) were converted to N - (3-azabicyclo[3.2.2]non-3-yl)-N'-{4-[$\beta$-(quinoline-2-carboxamido)ethyl]benzenesulphonyl} - urea (3.1 g.) m.p. 172–174° C. (after recrystallisation from methanol).

EXAMPLE 6

Isoquinoline-3-carboxylic acid (3.44 g.) in anhydrous acetone (50 ml.) and triethylamine (2.8 ml.) was agitated for 15 mins. at 5° C., treated dropwise with stirring with ethyl chloroformate (1.6 ml.) over 25 mins. and cooled at 0° C. p-($\beta$-aminoethyl)benzenesulphonamide (4 g.) in water (50 ml.) and triethylamine (2.8 ml.) was added suddenly and the mixture was agitated for 2 hours at 10om temperature; the acetone was removed by distillation. The mixture was acidified with dilute hydrochloric acid, and the crude product that separated was filtered and crystallised from ethanol to give 4-[$\beta$-(isoquinoline-3-carboxamido)ethyl]benzenesulphonamide (4.4 g.) m.p. 244° C. of which a portion (4.26 g.) was treated as in Example 1 with acetone (150 ml.), NaOH 2 N (6 ml.) and cyclohexyl-isocyanate (1.5 ml.), isolated and crystallised from ethanol to yield N-{4-[$\beta$-(isoquinoline-3-carboxamido)ethyl]benzenesulphonyl} - N' - cyclohexyl urea (4.6 g.) m.p. 194–197° C.

EXAMPLE 7

Using the procedures of Example 4 and 5, N-{4-[$\beta$-(isoquinoline - 3 - carboxamido)ethyl]benzenesulphonyl} methyl urethane (4.13 g.) and 1-amino-1-azacycloheptane (1.32 g.) were converted to N(1-azacyclohept-1-yl)-N'-{4-[$\beta$ - (isoquinoline - 3 - carboxamido)ethyl]benzenesulphonyl}urea (3.2 g.); while said methyl urethane (4.15 g.) and 3-amino-3-azabicyclo[3.2.2]nonane (1.6 g.) were converted to N-(3-azabicyclo[3.2.2]non-3-yl)-N'-{4-[$\beta$-(isoquinoline - 3 - carboxamido)ethyl]benzenesulphonyl} urea (3 g.).

EXAMPLE 8

Using the procedure of Example 1, cinnoline-4-carboxylic acid (3.17 g.) was converted to N-{4-[$\beta$-(cinnoline-4-carboxamido)ethyl]benzenesulphonyl} - N' - cyclohexyl urea (5.2 g.) m.p. 220–222° C. (after recrystallisation from dioxane).

EXAMPLE 9

Using the procedures of Examples 4 and 5, N-{4-[$\beta$-(cinnoline - 4 - carboxamido)ethyl]benzenesulphonyl} methyl urethane (4.15 g.) and 1-amino-1-azacycloheptane (1.32 g.) were converted to N-(1-azacyclohept-1-yl)-N'-{4-[$\beta$-(cinnoline - 4 - carboxamide)ethyl]benzenesulphonyl}urea (3.8 g.); while said methyl urethane (4.15 g.) and 3-amino-3-azabicyclo[3.2.2]nonane (1.45 g.) were converted to N-(3-azabicyclo[3.2.2]non-3-yl)-N'-{4-[$\beta$-(cinnoline - 4 - carboxamido)ethyl]benzenesulphonyl} urea (3.1 g.).

EXAMPLE 10

Preceeding as in Example 1, 2-methyl-quinazoline-4-carboxylic acid (3.17 g.) was converted to N-{4-[$\beta$-(2-methyl - quinazoline - 4 - carboxamido)ethyl]benzenesulphonyl}-N'-cyclohexyl urea (4.3 g.) m.p. 208–210° C. (after recrystallisation from ethanol).

EXAMPLE 11

Proceeding as in Example 4, N-{4-[$\beta$-(quinazoline-4-carboxamido)ethyl]benzenesulphonyl}methyl urethane (4.15 g.) and 1-amino-1-azacycloheptane (1.32 g.) were converted to N-(1-azacyclohept-1-yl)-N'-{4-[$\beta$-(quinazoline - 4 - carboxamido)ethyl]benzenesulphonyl}urea (2.96 g.); while said methyl urethane and 3-amino-3-azabicyclo [3.2.2]nonane were converted to N-(3-azabicyclo[3.2.2] non-3-yl)-N'-{4-[$\beta$-(quinazoline - 4 - carboxamido)ethyl] benzenesulphonyl}urea.

EXAMPLE 12

Using the procedure of Example 1, phthalazine-4-carboxylic acid (3.17 g.) was converted to N-{4-[$\beta$-(phthalazine - 4 - carboxamido)ethyl]benzenesulphonyl}-N'-cyclohexyl urea (5.4 g.).

EXAMPLE 13

Using the procedure of Example 4, N-{4-[β-(phthalazine - 4 - carboxamido)ethyl]benzenesulphonyl}methyl urethane (4.15 g.) and 1-amino-1-azacycloheptane (1.32 g.) were converted to N-(1-azacyclohept-1-yl)-N'-{4-[β-(phthalazine-4-carboxamido)ethyl}benzenesulphonyl urea (3 g.); while said methyl urethane and 3-amino-3-azabicyclo[3.2.2]nonane were converted to N-(3-azabicyclo[3.2.2]non - 3 - yl)-N'-{4-[β-(phthalazine-4-carboxamido)ethyl]benzenesulphonyl}urea.

EXAMPLE 14

Quinoxaline-2-carboxylic acid (3.17 g.) in anhydrous acetone (35 ml.) and triethylamine (2.55 ml.) was agitated for 15 mins. at 0° C., treated dropwise with stirring with ethyl chloroformate (1.96 ml.) over 30 mins. and cooled to −5° C. p-(β-aminoethyl)benzenesulphonamide (3.63 g.) in water (12 ml.) and triethylamine (2.55 ml.) was added suddenly and the mixture was agitated for 5 hours at room temperature and allowed to stand for a night. The acetone was removed by distillation and the residue was acidified with dilute hydrochloric acid. The product that separated was filtered and washed with warm ethanol to give 4-[β-(quinoxaline-2-carboxamido)ethyl]benzenesulphonamide (3.65 g.) m.p. 265° C., of which a portion (3.56 g.), suspended in a mixture of NaOH 2 N (5 ml.) and acetone (125 ml.), was treated dropwise with cyclohexylisocyanate (1.25 ml.), the temperature being kept at 0° to 5° C. The mixture was stirred for 3 hours at room temperature, diluted with water, and the undissolved products removed by filtration; the filtrate was acidified with dilute hydrochloric acid to give, after recrystallisation from ethanol, N-{4-[β-(quinoxaline-2-carboxamido)ethyl]benzenesulphonyl} - N' - cyclohexyl urea (1.7 g.) m.p. 218–220° C.

EXAMPLE 15

3-chloro-quinoxaline-2-carboxylic acid (3.73 g.) was refluxed with thionyl chloride (3 ml.) in anhydrous benzene (25 ml.) for 4 hours. The benzene and excess thionyl chloride were removed by distillation. The acid chloride residue in anhydrous dioxane was added dropwise to a suspension of p-(β-aminoethyl)benzenesulphonamide (3.63 g.) and anhydrous pyridine (2.9 ml.) and the mixture refluxed for 2 hours. The dioxane was removed by distillation and the residue added to dilute hydrochloric acid, filtered to give the raw 4-[β-(3-chloro-quinoxaline-2-carboxamido)ethyl]benzenesulphonamide, of which a portion (3.9 g.), treated as in Example 1, with acetone (50 ml.), NaOH 2 N (5 ml.) and cyclohexylisocyanate (2.55 ml.) was isolated and crystallised to give N-{4-[β-(3-chloro - quinoxaline - 2 - carboxamido)ethyl]benzenesulphonyl}-N'-cyclohexyl urea (4.1 g.).

EXAMPLE 16

Quinoxaline-2-carboxylic acid (3.48 g.) was reacted with thionyl chloride (2.5 ml.) in anhydrous benzene (25 ml.) for approximately 4 hours, and then the benzene and unreacted thionyl chloride were removed by distillation. A little anhydrous chloroform was added to the resulting acid chloride solution which was then added dropwise to a suspension in chloroform of N-[4-(β-aminoethyl)benzenesulphonyl - N' - cyclohexyl-urea (6.5 g.) containing anhydrous pyridine (3.65 ml.). The mixture was refluxed for 5 hours and the chloroform then removed by distillation. The residue was treated repeatedly with 1% ammonium hydroxide, filtered and acidified with 5% hydrochloric acid to give after filtration, the crude product which was crystallised from ethanol to give N-{4-[β-(quinoxaline - 2 - carboxamido)ethyl]benzenesulphonyl}-N'-cyclohexyl-urea (6.5 g.), m.p. 218–220° C. In a similar way, also the other compounds obtained according to any one of the Examples 1 to 13 and 15 were prepared.

EXAMPLE 17

N-{4-[β-(6,7-dimethyl - quinoxaline - 2 - carboxamido)ethyl]benzenesulphonyl}methyl urethane (9 g.), suspended in xylene (150 ml.) was treated with cyclohexylamine (2 g.) and then heated at 140° C. with vigorous stirring. The xylene was removed by decantation to give after crystallisation N-{4-[β-(6,7-dimethyl-quinoxaline-2-carboxamido)ethyl]benzenesulphonyl} - N' - cyclohexyl urea (7.85 g.).

EXAMPLE 18

N-{4-[β-(quinoxaline - 2 - carboxamido)ethyl]benzenesulphonyl}methyl urethane (4.15 g.) m.p. 199–201° C., after crystallisation from methanol, and 1-amino-1-azacycloheptane (1.32 g.) were dissolved in methanol (75 ml.), which was removed by distillation and the residue heated to 120° C. for 30 mins. The resulting N-(1-azacyclohept - 1 - yl)-N'-{4-[β-(quinoxaline-2-carboxamido)ethyl]benzenesulphonyl}urea was recrystallised from methanol (2.7 g.) m.p. 199–201° C.

EXAMPLE 19

Using the precedure of Example 18, N-{4-[β-(quinoxaline - 2 - carboxamido)ethyl]benzenesulphonyl}methyl urethane (4.15 g.) and 3-amino-3-azabicyclo[3.2.2]nonane (1.45 g.) were converted to N-(3-azabicyclo[3.2.2]non-3-yl)-N'-{4-[β-(quinoxaline - 2 - carboxamido)ethyl]benzenesulphonyl}urea (2.8 g.) m.p. 198–200° C.

EXAMPLE 20

Proceeding as in Example 1, 1,8-naphthyridine-3-carboxylic acid (3.17 g.) was converted to N-{4-[β-(1,8-naphthyridine - 3 - carboxamido)ethyl]benzenesulphonyl}-N'-cyclohexyl urea (2.3 g.).

EXAMPLE 21

Proceeding as in Example 4, N-{5-[β-(1,8-naphthyridine - 3 - carboxamido)ethyl]benzenesulphonyl}-methyl urethane (4.15 g.) and 1-amino-1-azacycloheptane (1.32 g.) were converted to N-(1-azacyclohept-1-yl)-N'-{4-[β-(1,8-naphthyridine - 3 - carboxamido)ethyl]benzenesulphonyl}urea (3 g.); while said methyl urethane and 3-amino-3-azabicyclo[3.2.2]nonane were converted to N-(3-azabicyclo[3.2.2]non-3-yl)-N'-{4 - [β - (1,8 - naphthyridine-3-carboxamide)ethyl]benzenesulphonyl}urea.

EXAMPLE 22

The compounds obtained according to any one of the Examples 17 to 21 were prepared also proceeding according to the method described in Example 16.

What is claimed is:

1. Compound of the formula:

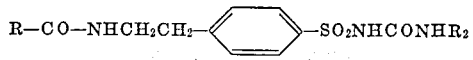

wherein R is selected from the group consisting of,

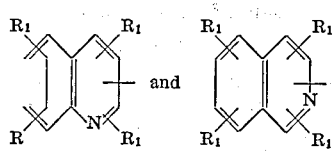

$R_1$ is independently selected from the group consisting of hydrogen, halogen, lower alkyl having 1–4 carbon atoms and lower alkoxy having 1–4 carbon atoms and $R_2$ is selected from the group consisting of cycloalkyl having 3–8 carbon atoms, azacycloalkyl having 3–7 carbon atoms and azabicycloalkyl having 5–10 carbon atoms.

2. Compound of the formula:

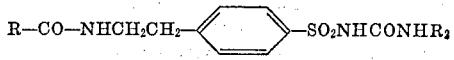

wherein R is selected from the groups consisting of

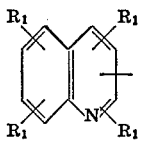 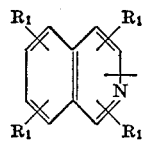

$R_1$ is independently selected from the group consisting of hydrogen, chlorine bromine, lower alkyl having 1-4 carbon atoms and lower alkoxy having 1-4 carbon atoms, and $R_2$ is selected from the group consisting of cyclohexyl, azacycloheptyl and azabicyclononyl.

3. N - {4 - [β - (quinoline-2-carboxamido)ethyl]benzenesulphonyl}-N'-cyclohexyl-urea, as claimed in claim 2.

4. N-{4-[β-(2-chloro - quinoline - 4 - carboxamido)ethyl]benzenesulphonyl}-N'-cyclohexyl-urea, as claimed in claim 2.

5. N-{4-[β-(2-methoxy - quinoline - 4 - carboxamido)ethyl]benzenesulphonyl}-N'-cyclohexyl - urea, as claimed in claim 2.

6. N - (1 - azacyclohept-1-yl)-N'-{4-[β-(quinoline-2-carboxamido)ethyl]benzenesulphonyl}urea, as claimed in claim 2.

7. N - (3-azabicyclo[3.2.2]non-3-yl)-N'-{4-[β-(quinoline - 2 - carboxamido)ethyl]benzenesulphonyl}urea, as claimed in claim 2.

8. N-{4-[β-(isoquinoline - 3 - carboxamido)ethyl]benzenesulphonyl}-N'-cyclohexyl-urea, as claimed in claim 2.

9. N-(1-azacyclohept-1-yl)-N'-{4 - [β - (isoquinoline-3-carboxamido)ethyl]benzenesulphonyl}urea, as claimed in claim 2.

10. N-(3-azabicyclo[3.2.2]non - 3 - yl)-N'-{4-[β-(isoquinoline - 3 - carboxamido)ethyl]benzenesulphonyl}urea, as claimed in claim 2.

References Cited
UNITED STATES PATENTS

| | | | |
|---|---|---|---|
| 3,340,297 | 5/1967 | Seefelder | 260—283 SA |
| 3,435,116 | 3/1969 | Weber et al. | 260—553 DA |
| 3,449,346 | 6/1969 | Aumuller | 260—281 |
| 3,507,954 | 4/1970 | Weber et al. | 260—553 DA |
| 3,507,961 | 4/1970 | Weber et al. | 424—321 |
| 3,578,658 | 5/1971 | Dietrich | 260—553 D |
| 3,655,756 | 4/1972 | Weber et al. | 260—287 R |
| 3,709,908 | 1/1973 | Weber et al. | 260—283 SA |
| 3,751,418 | 8/1973 | Weyer et al. | 260—283 SA |
| 3,420,882 | 1/1969 | Muth | 260—553 D |

OTHER REFERENCES

Ambrogi et al.: Arz. Forsch., vol. 21, pp. 200-7 (February 1971).

DONALD G. DAUS, Primary Examiner

U.S. Cl. X.R.

260—239 B, 250 R, 250 A, 251 Q, 256 YD, 286 R, 287 R, 293.59, 293.73, 294.86, 553 D; 424—250, 258

UNITED STATES PATENT OFFICE
CERTIFICATE OF CORRECTION

Patent No. 3,819,633         Dated  June 25, 1974

Inventor(s) Vittorio Ambrogi, Willy Logemann, Marcantonio Parenti and Raffaele Tommasini It is certified that error appears in the above-identified patent and that said Letters Patent are hereby corrected as shown below:

Column 1, line 63, left-hand formula should appear:

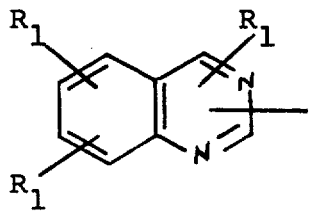

Column 4, line 14 correct the spelling of "Methocel"

line 51 under the heading "Dose" should read --1.5-- line 52 under the heading "Dose" should read --0.3--

Column 6, line 47 correct to read -carboxamido--.

Column 8, line 37, the compound should read "N- 4-[β . . ."

Claim 1, line 4, the left-hand structural formula should appear

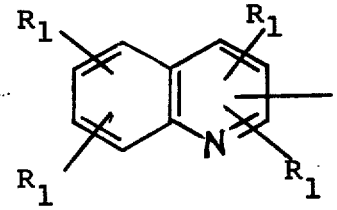

Claim 2, line 6 (col. 9, line 11) insert a comma after "chlorine"

Signed and sealed this 29th day of April 1975.

(SEAL)
Attest:

RUTH C. MASON
Attesting Officer

C. MARSHALL DANN
Commissioner of Patents
and Trademarks